US000001333H

United States Statutory Invention Registration [19]

[11] Reg. Number: H1333

Helfer et al.

[43] Published: Jul. 5, 1994

[54] HIGH STRENGTH REINFORCEMENT

[76] Inventors: Farrel B. Helfer, 453 Palisades Dr., Akron, Ohio 44303; Dong K. Kim, 4194 Big Spruce Dr., Akron, Ohio 44313; John G. Morgan, 7741 Fox Run Ave., NW.; Robert M. Shemenski, 204 Sutton Ave., NE., both of North Canton, Ohio 44720; Italo M. Sinopoli, 4646 Yale Ave., NW., Canton, Ohio 44709; Guy Jeanpierre, 82, Cité Steekraiz, Bissen, Grand Duchy of Luxembourg, 7790; Gia V. Nguyen, 164, Avenue de Mersch, Arlon, Belgium, 6700

[21] Appl. No.: 496,759

[22] Filed: Mar. 21, 1990

[51] Int. Cl.[5] ..... D04H 3/00

[52] U.S. Cl. ..... 428/294; 428/295; 428/377; 428/379; 428/492

[58] Field of Search ..... 428/294, 295, 377, 379, 428/390, 500; 57/212, 243, 902; 152/451, 537, 556, 560

[56] References Cited

U.S. PATENT DOCUMENTS

| | | | |
|---|---|---|---|
| 4,363,346 | 12/1982 | Pepe | 428/295 |
| 4,516,395 | 5/1985 | Palmer et al. | 57/237 |
| 4,586,324 | 5/1986 | Mizuma | 57/212 |
| 4,785,617 | 11/1988 | Bourgois et al. | 57/58.52 |
| 4,960,473 | 10/1990 | Kim et al. | 148/128 |
| 4,966,216 | 10/1990 | Kawasake et al. | 152/556 |

*Primary Examiner*—Robert L. Stoll
*Assistant Examiner*—Joseph D. Anthony

[57] ABSTRACT

Cord (36) reinforced composites 26 for tires (10) or the like having cords 36 in a diameter range of 0.30 mm to 1.6 mm with a cord break strength (CBL) of $N(720.4D^2-352.6D^3)CE$.

2 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

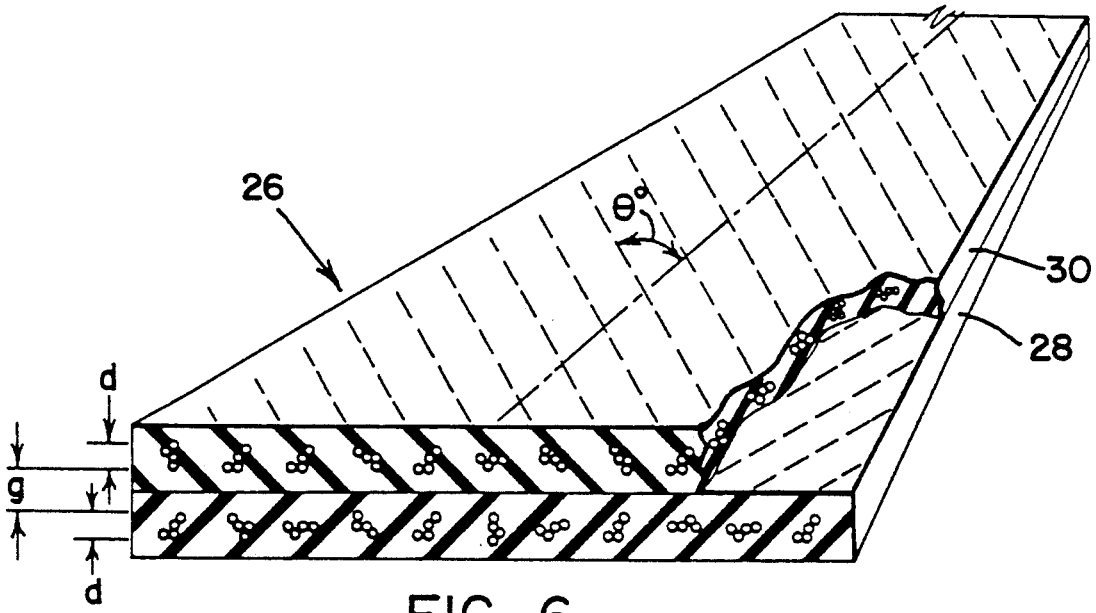
FIG. 6
FIG. 3
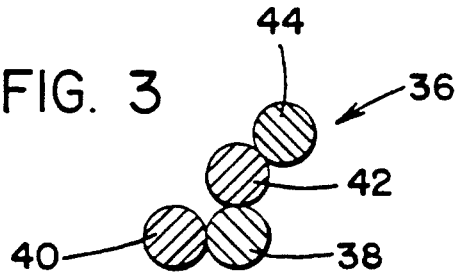
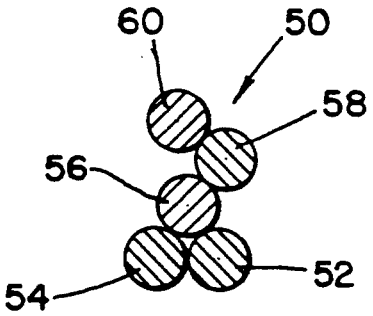
FIG. 4
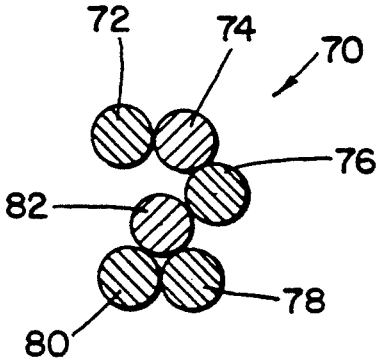
FIG. 5

HIGH STRENGTH REINFORCEMENT

This application is copending with assignee's U.S. application Ser. No. 07/415,948 filed Oct. 2, 1989, which discloses steel alloys for reinforcing wires/filaments for rubber products with increased strength and ductility and their process of manufacture which is hereby incorporated by reference thereto.

The present invention relates to cord, cord reinforced plies and radial tires for vehicles so reinforced. Radial tires are those tires wherein the cords of the carcass plies which extend from one bead to the other lie substantially on radial planes.

Particularly, the present invention relates to a cord reinforced composite having rubber where preferably the structure is for tires and a tire carcass or belt wherein at least one of two plies in the belt has the cords therein biased with respect to the direction of rotation of the tire.

Reinforced elastomeric articles are well known in the art for example for conveyor or like type belts, tires etc., with cords of textile and/or fine steel wire, particularly belts for pneumatic tires with up to four plies with the cord reinforcement between adjacent plies being opposingly biased with respect to the direction of movement of the tire where it is desired to reinforce in the lateral direction in addition to the direction of rotation of the tire. Further, cords made of multi twisted filaments of fine wire with two or more filaments in a single strand construction having a wrap filament thereround to reinforce the above structure have also been known. More recently multi strand cords such as $2+7\times0.22+1$ have been found necessary to meet the higher demand of fatigue life for composites in tire belts but are more expensive to make. Even more recently, there has been use of single strand cords of multi filaments which are not twisted about each other but rather twisted altogether as a bundle or bunch to simplify the cord construction. Higher fatigue life requirements for composites in tires have resulted in cords with smaller filament diameter requiring more filaments in the cord to obtain the necessary strength.

Most recently two ply tire belts for passenger and light truck tires have been used having cords of $2\times0.30$HT and $2+2\times0.30$HT, respectively. An example of the $2\times$ cord can be found in Assignee's prior application, now published as EP 0 237462 on Sep. 16, 1987. These cords were made of high tensile (HT) steel of a carbon content by weight greater than 0.80% which was of a lesser strength than the above steel alloys which will be referred to herein as super tensile (ST).

Many problems have had to be overcome even after development of the above steel alloys and filaments. The higher strength steel alloys resulted in changes in cord modulus giving rise to the possibility of adjusting the parameters of a tire belt gross load described in the above identified $2\times$ cord application as depending upon three factors assuming adequate cord to rubber adhesion. The factors are cord modulus, the ratio of cord volume to rubber volume which is often expressed as the number of cord ends per inch, and the angle of cord reinforcement. As further previously noted, as the angle of cord reinforcement approaches the direction of rotation of the tire the support from the reinforcement in the lateral direction moves toward zero. An increase in the above-mentioned two other cord related factors generally results in an increase of weight for the belt. Added weight means added cost and higher rolling resistance of a tire. Lighter cords with a lower modulus do not solve the problem because even though they have lower weight they also have a lower cord modulus which must be offset by increasing the ratio of cord to rubber volume. This increase in cord volume is limited by the physical size of the cord and the resulting spacing between the cords which governs the ability of the rubber to penetrate between the cords for good cord to rubber adhesion.

The challenge was to determine cord structure which could take advantage of the new cord modulus while not adversely affecting cord volume to rubber volume ratio on lateral reinforcement.

After considerable study, effort, testing and time, the present invention provided cords for truck tire Load Ranges E, F, G and H which substantially reduced the number of filaments for these Load Ranges. While a reduction in the number of filaments would lead one to expect a reduction in weight, this would not necessrily be the case where the filament size was increased. Under such circumstances, cord was found for use in the Load Ranges by varying the ends per inch (EPI) in the plies of the belt. Other advantages which exist in the present invention include improved rolling resistance in at least one instance and a reduction in the cord gum coat gauge between the cord layers in the belt in another instance. A weight reduction due to reduction in weight of reinforcement as well as reduction in an amount of gum gauge also result in a reduction in cost for the tire of the present invention. Further, the new belt structure gives better rolling resistance perhaps because of the higher stiffness of the new cord over the old cord being used for reinforcement in the belt structure.

As indicated below, the present invention will be shown to have substantially maintained the gross load for a tire belt while reducing weight and cost using stronger filament in cord constructions not useable previously, even with high tensile filaments, and accompanying cord volumes and angles which reduce material in the tire. Similar advantages have been achieved with carcass plies as well.

A cord for a reinforced composite structure according to the present invention is preferably made of multiple filaments and has a diameter range or 0.15 to 0.38 mm, each filament made of steel having at least a tensile strength (TS) defined by the expression: $TS=K_1-K_2D$ where $K_1=4080N/MM^2$, $K_2=2000N/MM^2$ and D is the filament diameter in MM.

Also included is a reinforced layer of elastomer for reinforcement of elastomeric articles having at least one layer of cord spaced in a direction lateral to the direction of reinforcement, each cord having a diameter in the range of 0.30 mm to 1.6 MM, and may be formed in a single step where all its filaments have the same lay direction, each cord made of steel having a cord break load in pounds (CBL) defined by the expression: $CBL=N(720.4D^2-352.6D^3)CE$ where CE is the cord efficiency, D is the filament diameter in millimeters and N is the number of filaments in each cord.

Further, this invention provides a pneumatic radial tire with a carcass having radial cords and two sidewalls spaced apart a distance which in the axial direction determines the width of the tire section. The tire has two beads each one of which around which are turned up, from the inside toward the outside, the ends of the cords of the carcass. A tread is disposed on the crown of the carcass, and a belt structure that is circumferentially inextensible is interposed between the tread and the carcass. The belt structure has a width that is substantially equal to that of the read and has two radially overlapped layers of elastomeric fabric reinforced with metallic cords. The metallic cords are parallel to each other in each layer and crossed with the cords of the facing layer and inclined at an angle of between 19° and 66° with respect to the equatorial plane of the tire. The belt structure has an inch strength defined by the expression: $BIS=N(720.4\ D^2-352.6\ D^3)\ CE\times EPI$ where: N=2 to 6 filaments; D=0.30 to 0.38 filament diameter; CE=cord efficiency at 94 to 97%; and EPI=20 to 23 when N=2 for passenger tire EPI=10 to 18 when N=4 for Load Range E, F and G; EPI=8 to 18 when N=5 for Load Range F and G: and EPI=8 to 18 when N=6 for Load Range H.

Super tensile cords of more than 6 filaments have also been developed and in some case the previous construction, whether normal or high tensile cord, has been simplified by reducing the number of filaments in the super tensile cord.

The above cords have the advantages of a 7 to 9% increase in cord break load over a predecessor cord made of high tensile steel. Those cords having a smaller cord diameter over previously used cord in a reinforcement of at least one layer of belt or ply of the present invention results in less rubber gauge being used where a comparable thickness of rubber is laid on each side of the reinforcing cord upon calendering. A smaller diameter cord results in less weight in the reinforcement resulting in lower rolling resistance for a tire thereby reinforced.

Further, all of the above cords result in lower linear density in the reinforcement for which they are used which again results in less weight and lower cost for the reinforcement and its product, be it tire, belt or any other reinforced elastomeric.

The above advantages of the invention will become readily apparent to one skilled in the art from reading the following detailed description of an embodiment of the invention when considered in the light of the accompanying drawings in which FIGS. 1 and 2 illustrate tire sections having composite structures according to the present invention;

FIGS. 3–5 are cross sections through cords in accordance with an embodiment of the present invention;

FIG. 6 is a schematic of a composite in accordance with the present invention.

As used herein and in the Claims:

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Cord" means one or more of the reinforcement elements, formed by one or more filaments/wires which may or may not be twisted or otherwise formed which may further include strands so formed which strands may or may not be also so formed, of which the plies in the tire are comprised.

"Crown" means that portion of the tire within the width limits of the tire tread.

"Density" means quantity per unit length.

"Equatorial plane (EP)" means the plane perpendicular to the tire's axis of rotation and passing through the center of its tread.

"Gauge" means material thickness.

"Load Range" means load and inflation limits for a given tire used in a specific type of service as defined by tables in *The Tire and Rim Association, Inc.*, 1989 *Year Book*.

"Radial" and "radially" are used to mean directions radially toward or away from the axis of rotation of the tire.

"Rivet" means the open space between cords in a layer.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Stiffness Ratio" means the value of the control belt structure stiffness divided into the value of another belt structure when the values are determined by a fixed three (3) point bending test having both ends of the cord fixed and flexed by a load centered between the fixed ends.

"Super Tensile Steel" (ST) means a steel as defined in the above referenced application Ser. No. 07/415,948, or a tensile strength of at least $TS=K_1-K_2D$.

"Tread" means that portion of a tire that comes into contact with the road when the tire is normally inflated and under normal load.

Figure 1:
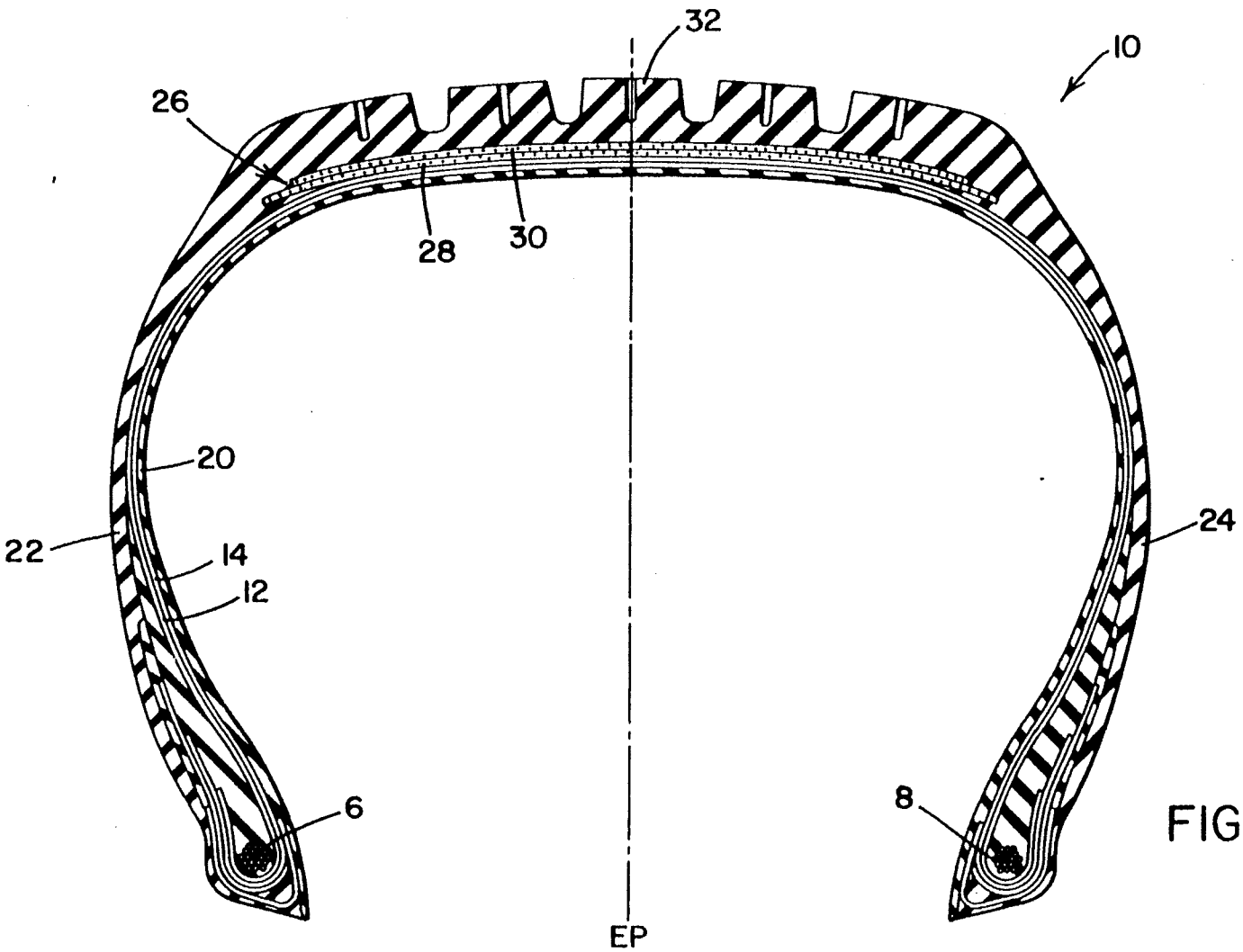
Figure 2:
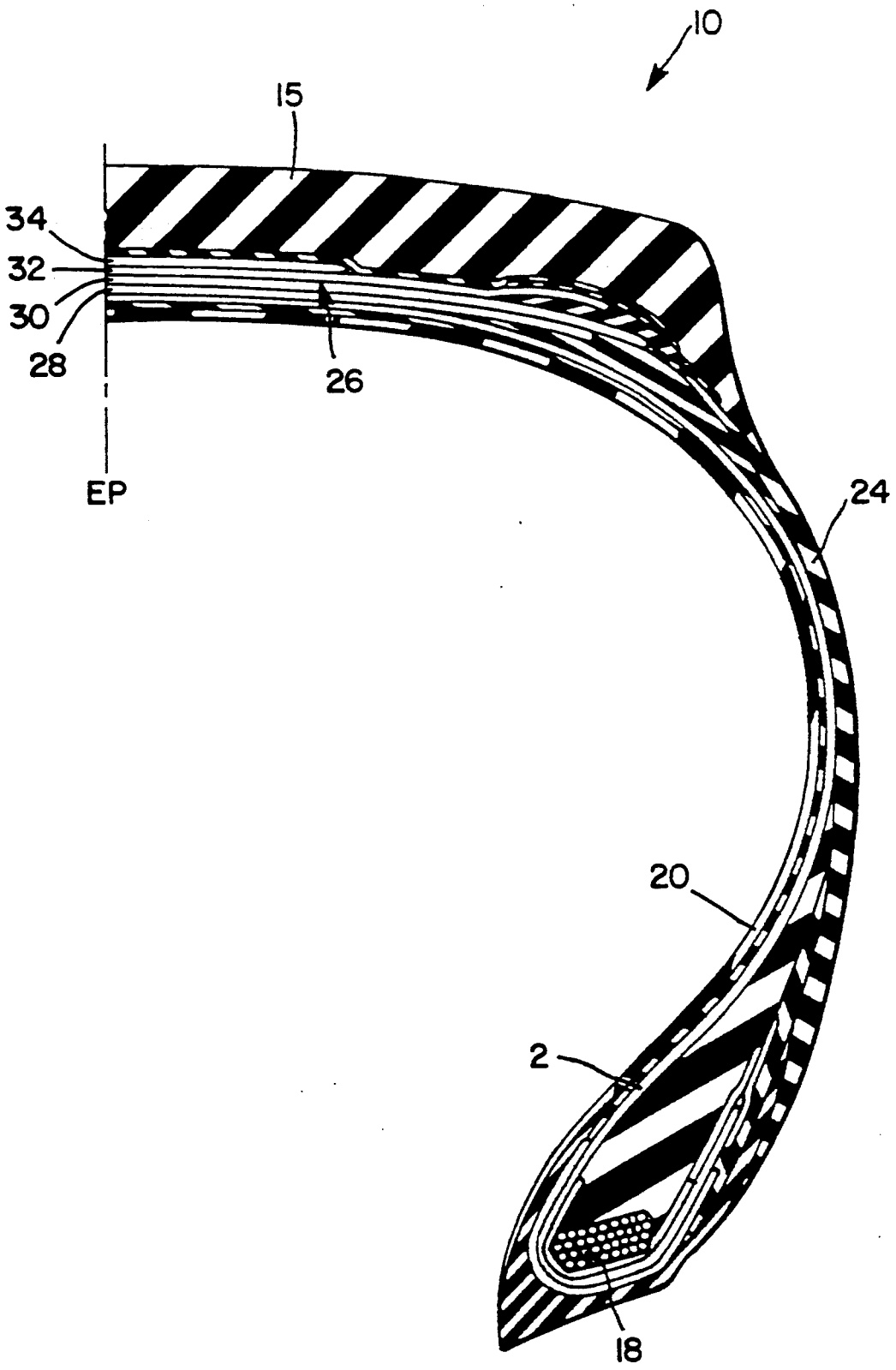

Referring to FIGS. 1 and 2 of the drawings, a ply 12 is shown within pneumatic tires 10 with a radial carcass wherein like elements have received like reference numerals. For the purposes of the present invention, a tire has a radial ply carcass structure when the cords of the carcass reinforcing ply, or plies 12,14 are oriented at angles in the range of 75° to 90° with respect to the equatorial plane (EP) of the tire.

The tire 10 has a pair of substantially inextensible annular beads 16,18 which are axially spaced apart from one another. Each of the beads 6,8 is located in a bead portion of the tire 10 which has exterior surfaces configured to be complimentary to the bead seats and retaining flanges of a rim (not shown) upon which the tire 10 is designed to be mounted. Plies may be of side-by-side reinforcing cords of polyester material, or of cord of the present invention and extend between the beads with an axially outer portion of the carcass structure folded about each of the beads. While in the embodiment of FIG. 1, the carcass ply structure comprises two plies of reinforcing material, it is understood that one or more carcass plies of any suitable material may be employed in certain embodiments and one or more plies of reinforcement according to this invention may be used as well.

A layer of a low permeability material 20 may be disposed inwardly of the carcass plies 12,14 and contiguous to an inflation chamber defined by the tire and rim assembly. Elastomeric sidewalls 22,24 are disposed axially outwardly of the carcass structure. A circumferentially extending belt structure 26 comprising in the embodiments shown two layers 28,30 (FIG. 1), or four layers 28,30,32,34 (FIG. 2), each of which preferably comprises steel reinforcing cords 36 (FIG. 3) is characterized by the cords 36 having filaments 38,40,42 and 44 with a breaking strength of at least 3650 $N/MM^2$. While two and four layer belts are illustrated, other numbers are applicable as well.

It will be appreciated that other laminates can be formed using principals of the present invention for reinforcing other articles such as industrial belts and that a single ply of the present invention can be used with known or conventional plies to also form new useful reinforced composite structures.

Preferably the cords 36 are comprised of four filaments of finely drawn super tensile steel wire. As noted in the application incorporated by reference above, there are a number of metallurgical embodiments which result in the tensile strength defined above as super tensile (ST). Table 1 below gives calculated values of filament break load for super tensile filaments in comparison to previous high tensile filaments for various filament diameters. The first group being filaments which were made and the second group additional sizes identified as useful and to be made. In each case the super tensile gives a higher value.

TABLE 1

FILAMENT STRENGTH ANALYSIS

| FIL. DIA. (MM) | HT Brk Load, Lbs | ST Brk Load, Lbs |
|---|---|---|
| .20 | 24.1 | 25.9 |
| .22 | 28.9 | 31.1 |
| .255 | 38.0 | 40.8 |
| .28 | 45.4 | 48.5 |
| .350 | 68.9 | 72.9 |
| .30 | 51.8 | 55.1 |
| .325 | 59.9 | 64.1 |
| .380 | 79.4 | 84.5 |

In addition to the determination of the above candidates to qualify for super tensile steels, it was also necessary to determine those which were further capable of long fatigue life, and more particularly those adaptable to tire cord filament. Super tensile candidates which qualified for strength did not always give long fatigue life. As a result, some candidates were found suitable, while others were not, and still others were preferred.

The cords 36 used in the working example have a structure of four filaments 38,40,42 and 44 of 0.35 mm diameter super tensile steel wire and a cord 36 break strength of 1308 Newtons plus or minus 96 Newtons. Each cord 36 has two filaments 38,40 twisted together with a 16 mm lay length and these two filaments 38,40 are twisted at a 16 mm lay length together with the remaining two filaments 42,44 which are untwisted and parallel to each other when twisted together with the twisted filaments 38,40 all in the same twist direction. This cord is designated as 2+2×0.35ST. The 2+2 construction is known for its openness and good rubber penetration resulting from the openness. The 0.35 designates the filament diameter in millimeters and the ST designates the material being super tensile.

Following are other embodiments of super tensile cord matched for comparison with the former tire cord which it replaced, some former cords of which are high tensile HT as well as normal tensile (NT) steel cords, the above example cord 36 being listed last:

| | Former Cord (Structure Dia. [MM]) | | Super Tensile Cord (Structure Dia. [MM]) | |
|---|---|---|---|---|
| 1. | 2x.30HT | 0.60 | 2x.255 | 0.51 |
| 2. | 3x.25NT | 0.50 | 3x.20 | 0.40 |
| 3. | 3x.265/9x.245HT | 1.02 | 3+2x.35 | 1.10 |
| 4. | 5/8/14x.22NT | 1.32 | 3+3x.35 | 1.10 |
| | 3x.265/9x.245HT | 1.02 | 3+3x.35 | 1.10 |
| 5. | 3x.22/9x.20HT | 0.84 | 3x.22/9x.20 | 0.84 |
| 6. | 3x.256/9x.245HT | 1.05 | 3x.28/9x.255 | 1.07 |
| 7. | 27x.175HT+1 | 1.08 | 1x.22/18x.20 | 1.02 |
| 8. | 27x.22NT | 1.32 | 1x.22/18.x20 | 1.02 |
| 9. | 7x7x.25NT | 2.25 | 5/8/14x.265 | 1.59 |
| 10 | 3x.265/9x.245HT | 1.02 | 2+2x.35 | 1.05 |

The illustrated example and candidates 1 to 4 above show a reduction in, to less than equal, cord diameter with the first mentioned five candidates, items 1–4 and 10, further being of a simpler construction; i.e. fewer filaments of open construction to enhance corrosion resistance in addition to reducing gauge material and cost with the previously noted smaller diameter cord making the tires lighter in weight and less costly.

Table 2, below, gives a direct comparison between a number of 4 filament cords of high tensile HT and super tensile ST of varying filament diameters showing an increase in strength in all cases. The cord break strength (CBL) is defined in terms of cord efficiency (CE) which is the value of the cord break load over the value of the break load of the cord filaments times the number of filaments in the cord. The values in each case can be measured by breaking each. Note that not all the cord samples in Table 2 became candidates noted above.

TABLE 2

CORD STRENGTH

Strength in lbs = Filament Break Load × Number of Filaments × CE (.97)

| CORD | HT Tensile of Avg | HT Tensile of Min | ST Tensile of Avg | ST Tensile of Min |
|---|---|---|---|---|
| 2+2x.30 | 200 | 190 | 223 | 212 |
| 2+2x.325 | 245 | 233 | 263 | 250 |
| 2+2x.35 | 272 | 258 | 303 | 288 |
| 2+2x.38 | 320 | 304 | 358 | 340 |

Table 3 below again compares high tensile and super tensile cord samples of 3×0.22/9×0.20+1 and 3×0.26/9×245+1 construction for fatigue properties with super tensile again exceeding high tensile in a three roll fatigue test. The three roll fatigue test consists of three rolls on 1⅜" (34.9 MM) centers with 1 inch diameter pulleys, unless otherwise specified, cycled at 330 cycles per minute under a load which is 10% of cord breaking strength. The middle roll of the three rolls is offset from the remaining two rolls, and the cord, embedded in a strip of elastomer ¼"×½"×22" (6.35 MM ×12.70 MM ×558.8 MM), is passed under the two rolls and over the middle roll in each cycle to reverse the bending on the cord as it passes over the rolls.

TABLE 3

FATIGUE EVALUATION (Cycles to failure, three roll fatigue test with standard cradle and 1 inch pulley)

| | 3x.22/9x.20+1 | 3x.26/9x.245+1 |
|---|---|---|
| High Tensile | 26584 | 9847 |

TABLE 3-continued

| FATIGUE EVALUATION (Cycles to failure, three roll fatigue test with standard cradle and 1 inch pulley) | 3x.22/9x.20+1 | 3x.26/9x.245+1 |
|---|---|---|
| Super Tensile | | |
| Sample A | 31615 | 11174 |
| Sample B | 33274 | 10901 |
| Sample C | 33875 | 10891 |

TABLE 4

| BENCH SCALE FATIGUE EVALUATION (Cycles to Failure, Three Roll fatigue test with standard cradle and varying pulley) | 2x.30 Cord | |
|---|---|---|
| Cradle/ Pulley dia | Hi Tensile | Super Tensile |
| 1 in | 2430 | 2324 |
| .75 in | 3287 | 4337 |
| 1 in | 8349 | 13210 |
| 1.25 in | 29952 | 31312 |

Figure 7:
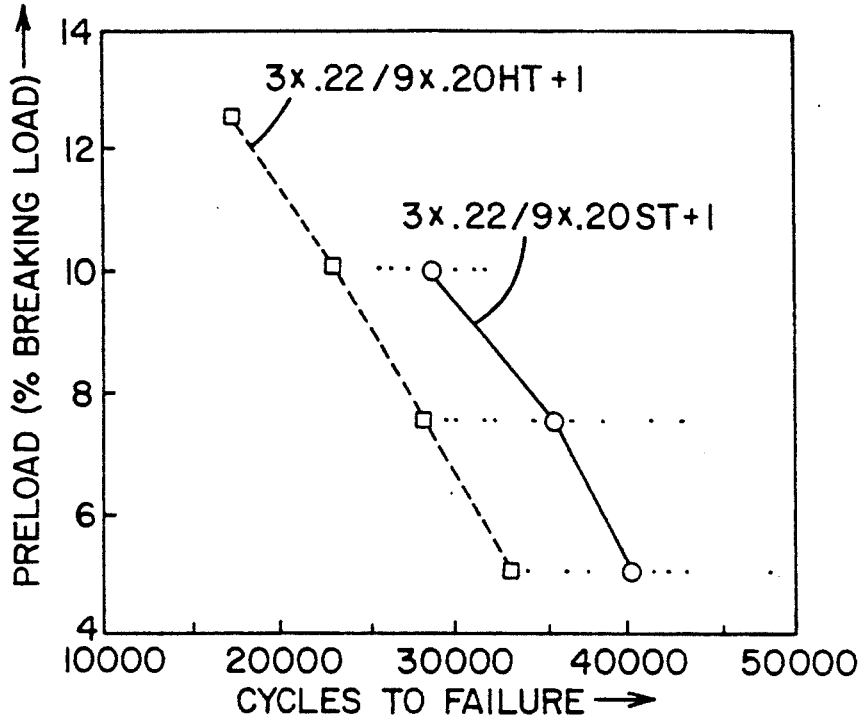
FIGS. 7–8 are graphs comparing fatigue of high tensile and super tensile cords.
Figure 8:
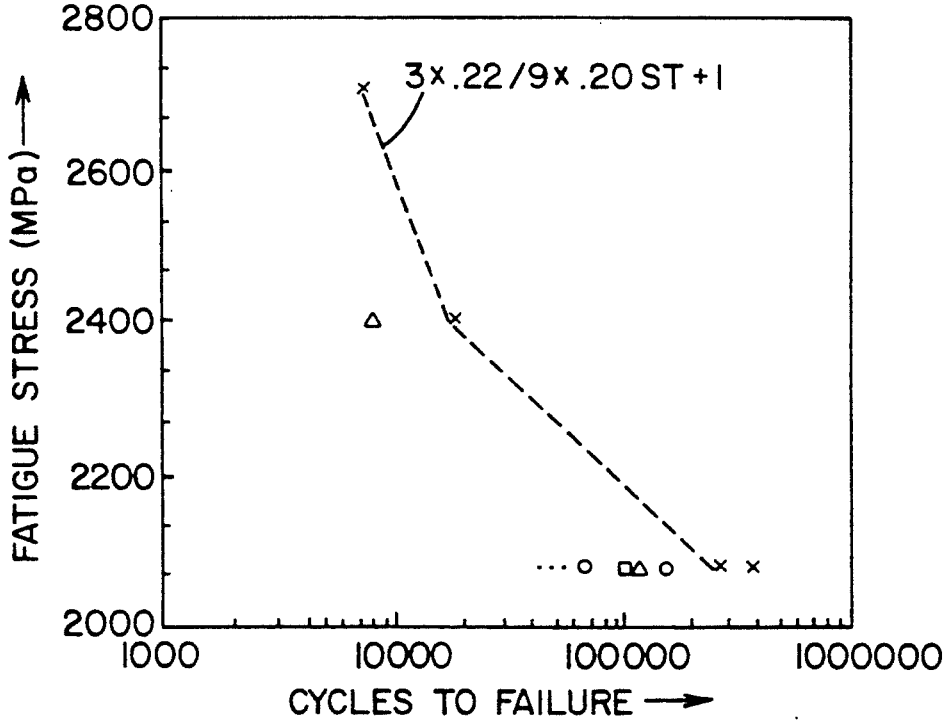

Table 4 above compares high tensile and super tensile in a 2×0.30 cord where the fatigue test pulley diameter was varied to enhance the results and again shows a higher fatigue for the super tensile cord A further comparison of high tensile an tensile cord is given graphically in FIG. 7, again using the three roll fatigue test, and FIG. 8 is a graph of the same super tensile cord, both graphs illustrating the higher fatigue properties of super tensile cord. This cord is found to be particularly applicable to tire sidewall ply reinforcement where the super tensile cord has permitted a reduction in end count (EPI) of 2 EPI in going from high tensile cord to super tensile with no other changes occurring in the ply or cord.

For equal filament diameters, the super tensile cords have higher strength and fatigue life over predecessor high tensile cords, and the cord candidates the list following Table 1 also have their filaments all twisted in the same direction with the same lay length to accommodate single twist operations. These advantages lead to elastomer products which have less reinforcement material and thus lower weight and cost. Further the life of the product can be increased with the increase in fatigue life of the cord and its filaments.

As noted above, a major variant which may be varied in a reinforced composite of elastomer is the end count, or EPI (end per inch), which is the number of cords per unit length in the lateral direction to the direction in which the elastomer is being reinforced. Table 7 below lists samples of high tensile and possible super tensile candidates showing the general increase in rivet as the increased strength of the super tensile samples allowed a reduction in EPI. At the other extreme, as cord diameter is reduced and end count increased to off-set it, the rivet is reduced as for Load Range H. Generally a minimum rivet of 0.018" must be maintained to give proper penetration of elastomers between cords when they are so embedded. This minimum rivet is particularly obtainable with the smaller diameter and simpler (less filaments in a cord) cord construction.

TABLE 7

| TENSILE COMPARISON | | | |
|---|---|---|---|
| Load Range | Cords | EPI | Rivet |
| | High Tensile | | |
| F/G | 3x.22/9x.20+1HT | 16 | 0.70 |

TABLE 7-continued

| TENSILE COMPARISON | | | |
|---|---|---|---|
| Load Range | Cords | EPI | Rivet |
| H | 27x.175+1HT | 11 | 1.23 |
| J | 27x.175+1HT | 15 | 0.61 |
| | Super Tensile | | |
| F/G | 3x.22/9x20+1 | 14 | 0.93 |
| H | 3x.22/9x.20+1 | 16 | 0.70 |
| J | 1x.22/18x.20+1 | 16 | 1.09 |

The same considerations which exist for a single layer or ply above also exist for multi layer and/or belt constructions as depicted in Tables 8 and 9 below.

TABLE 8

| RMT BELTS (LRG) | | | Super Tensile | |
|---|---|---|---|---|
| | HIGH TENSILE | | 2+2x.35 EPI | 3+2x.35 EPI |
| Layer 1 | 3x.22/9x.20+1 | 14 EPI | 13 | 10 |
| Layer 2 | 3x.265/9x.245+1 | 12 | 17.5 | 14 |
| Layer 3 | 3x.265/9x.245+1 | 12 | 17.5 | 14 |
| Layer 4 | 3x.265/9x.245+1 | 08 | 13 | 10 |

TABLE 9

| BELT STRENGTH ANALYSIS (LRG) | | | |
|---|---|---|---|
| | Construction | EPI | Lbs/Inch |
| Layer 1 | 3/22/9x.20+1HT | 14 | 3780 |
| Layer 2 | 3x.265/9x.245+1HT | 12 | 4608 |
| Layer 3 | 3x.265/9x.245+1HT | 12 | 4608 |
| Layer 4 | 3x.265/9x.245+1HT | 08 | 3072 |

Table 8 compares a prior high tensile belt of four layers with two candidates of super tensile with comparable strength in radial medium truck tire belts of a load range G. The cords are from the preferred group identified above. Generally it can be observed that the smaller diameter super tensile cord requires more EPI, but not for the first layer which requires less because of the off-set of the larger diameter filaments. Table 9 is a strength analysis for the prior high tensile belt of Table 8.

Table 10 gives a test sample tire belt and ply construction of super tensile material and two additional candidates. The satisfactory results of the test sample indicated improved rolling resistance and that super tensile could be used in all load ranges by varying the end count (EPI). Each of the reinforcement packages resulted in the listed belt inch strengths.

TABLE 10

| INCH STRENGTH Test Sample (11R24.5 167G Truck Tire LRG) | | | |
|---|---|---|---|
| BELT LAYER | CORDS | EIP | In Str |
| 1 | 3x.22/9/x.20+1 | 14 | 3780 |
| 2 | 3x.28/9x.255 | 12 | 5296 |
| 3 | 3x.28/9x.255 | 12 | 5296 |
| 4 | 3x.28/9x.255 | 8 | 3528 |
| Ply | 3x.22/9x.20ST+1 | 14 | — |
| | Candidate 1 | | |
| 1 | 2+2x.35 | 13 | 3290 |
| 2 | 2+2x.35 | 17.5 | 4690 |
| 3 | 2+2x.35 | 17.5 | 4690 |
| 4 | 2+2x.35 | 13 | 3290 |
| | Candidate 2 | | |
| 1 | 3+2x.35 | 10 | 3360 |
| 2 | 3+2x.35 | 14 | 4704 |

TABLE 10-continued

| INCH STRENGTH Test Sample (11R24.5 167G Truck Tire LRG) | | | |
|---|---|---|---|
| BELT LAYER | CORDS | EIP | In Str |
| 3 | 3+2x.35 | 14 | 4704 |
| 4 | 3+2x.35 | 10 | 3360 |

More particularly, the value of the above type constructions are also seen as applicable to and useful for light truck tires in load ranges E/F where belts of two layers are preferred as illustrated in FIG. 4 with 2+2×0.35ST cords at 6.9 ends per centimeter (17.5 EPI) with the angle $\theta$ of one layer being approximately 19½° and the other ply having an identical but opposing angle. Another construction would be 3+2×0.35ST cords at 5.5 ends per centimeter (14 EPI) and the same angle as the first light truck tire example including two opposing layers. These constructions would replace a current construction of 3×0.265/9×0.245HT+1 at 4.7 and 5.5 ends per centimeter (12 and 14 EPI). The above tire selections came only after extensive study and testing which included the lab test results in Table 11 below.

TABLE 11

| Test Tire Results (11R24.5 G167A Truck Tire LRG) Control | | |
|---|---|---|
| Component | Cord | EPI |
| Belt 1 | 3x.22/9x.20HT+1 | 14 |
| Belt 2 | 3x.265/9x.245HT+1 | 12 |
| Belt 3 | 3x.265/9x.245+1 | 12 |
| Belt 4 | 3x.265/9x.245HT+1 | 8 |
| Ply | 3x.22/9x.20HT+1 | 16 |
| Test | Data | |
| Rolling Resistance | 34.2 lbs | |
| Smooth Wheel Duration | 17041 F bes | |
| Bead Duration | 4351 F pes | |
| | 7012 F fl ck | |
| ODR | 56788 F pes | |
| | 58231 F pes | |
| Tire Sample | 80 tires | |
| Super Tensile | | |
| Component | Cord | EPI |
| Belt 1 | 3x.22/9x.20+1 | 14 |
| Belt 2 | 3x.28/9x.255 | 12 |
| Belt 3 | 3x.28/9x.255 | 12 |
| Belt 4 | 3x.28/9x.255 | 8 |
| Ply | 3x.22/9x.20+1 | 14 |
| Test | Data | |
| Rolling Resistance | 33.5 lbs | |
| Smooth Wheel Duration | 13065 F bes | |
| | 17979 F bes | |
| Bead Duration | 13532 F pes | |
| | 13022 F pes | |
| ODR | 65315 F | |
| | 67787 F 3rd bes | |
| Treadwear | 142K S/F & retrd | |
| Treadwear Rating | 97 | |
| Tire Sample | 104 tires | |

Using, again, the 11R24.5 G167A truck tire, Load Range G, this tire has a four layer belt as depicted in Tables 12 and 13 below for a prior belt and a super tensile belt, respectively together with a weight analysis. The reduction in weight of both cord and cord rubber of 4.7% results in a savings per tire in material alone of 25%.

TABLE 12

| WEIGHT & COST ANALYSIS PRIOR BELT PACKAGE (11R24.5 167G TRUCK TIRE LRG) | | | | |
|---|---|---|---|---|
| | | | Treatment Weight (Lbs) | |
| | Construction | EPI | Rubber | Wire |
| Layer 1 | 3x.22/9x.20+1 | 14 | 1.19 | 1.26 |
| Layer 2 | 3x.265/9x.245+1 | 12 | 2.70 | 3.05 |
| Layer 3 | 3x.265/9x.245+1 | 12 | 2.44 | 2.76 |
| Layer 4 | 3x.265/9x.245+1 | 08 | 1.16 | 1.08 |
| Total | | | 7.49 | 8.15 |
| | | | 15.64 Lbs | |

TABLE 13

| | | | Treatment Weight (Lbs) | |
|---|---|---|---|---|
| | Construction | EPI | Rubber | Wire |
| WEIGHT ANALYSIS BELT PACKAGE WITH LRG 2+2x.35 (11R24.5 167G TRUCK TIRE) | | | | |
| Layer 1 | 2+2x.35 | 13 | 1.38 | 1.14 |
| Layer 2 | 2+2x.35 | 17.5 | 2.50 | 2.76 |
| Layer 3 | 2+2x.35 | 17.5 | 2.25 | 2.49 |
| Layer 4 | 2+2x.35 | 13 | 1.46 | 1.08 |
| Total | | | 7.59 | 7.47 |
| | | | 15.06 Lbs | |
| WEIGHT ANALYSIS BELT PACKAGE WITH LRG 3+2x.35 (11R24.5 167G TRUCK TIRE) | | | | |
| Layer 1 | 3+2x.35 | 10 | 1.46 | 1.09 |
| Layer 2 | 3+2x.35 | 14 | 2.62 | 2.76 |
| Layer 3 | 3+2x.35 | 14 | 2.37 | 2.49 |
| Layer 4 | 3+2x.35 | 10 | 1.53 | 1.04 |
| Total | | | 7.98 | 7.38 |
| | | | 15.36 Lbs | |

It has been observed for Load Range G the belt structure for an 11R24.5 G167A truck tire with the above 2+2×0.35ST reinforcement has a stiffness of 36 Newtons/MM on a laboratory 3 point bending; i.e., knife edge ends center impingement, stiffness test as compared to 28 Newtons/MM for its predecessor, 3×0.265/9×0.245HT+1 at 12 EPI on the same test. This is a ratio of 1.29 of the new belt stiffness over the old (control). While not proven, theoretically the belt stiffness is responsible for, or at least contributes to, the improvement in rolling resistance.

The 2×0.255ST candidate was placed in the belt of a P275/40ZR17 high performance tire in place of 2×0.30HT and was found to be better for dry handling giving a more solid feel and better oversteer but slightly less wet handling. Force and moment, high speed and subjective handling were found equal while rolling resistance was slightly worse and R5HT (torque) was better. Testing continues with further candidates in off-the-road tires such as ⅝/14×0.265ST+1 in the carcass and belts of 1800R33RL4J through 3600R51 size tires. Data is slow coming back on these large tires. In accordance with the provisions of the patent statutes, the principle and mode of operation of the tire have been explained and what is considered to be its best embodiment has been illustrated and described. It should, however, be understood that the invention may be practiced otherwise than as specifically illustrated and described without departing from its spirit and scope.

We claim:

1. A reinforced layer of elastomer for reinforcement of elastomeric articles having at least one layer of cord spaced in a direction lateral to the direction of reinforcement, each cord have a diameter in the range of 0.30 mm to 1.6 mm and formed in a single step where all its filaments have the same lay direction, each cord made of steel having a cord break strength (CBL) defined by the expression:

$$CBL = N(720.4D^2 - 352.6D^3)CE$$

where CE is the cord efficienty, D is the filament diameter of 0.255 MM and N is the number of filaments in each cord.

2. The reinforced layer of elastomer in claim 1 wherein the cord construction is $2 \times 0.255$.

* * * * *